United States Patent
Gao

(10) Patent No.: US 12,506,214 B2
(45) Date of Patent: Dec. 23, 2025

(54) BATTERY ENCLOSURE FOR ELECTRIFIED VEHICLE

(71) Applicant: Ford Global Technologies, LLC, Dearborn, MI (US)

(72) Inventor: Fei Gao, Hefei (CN)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 18/225,192

(22) Filed: Jul. 24, 2023

(65) Prior Publication Data
US 2024/0055716 A1    Feb. 15, 2024

(30) Foreign Application Priority Data
Aug. 11, 2022   (CN) .......................... 202210961432.3

(51) Int. Cl.
*H01M 50/264*    (2021.01)
*B60L 50/60*    (2019.01)
(Continued)

(52) U.S. Cl.
CPC ........... *H01M 50/264* (2021.01); *B60L 50/64* (2019.02); *B60L 50/66* (2019.02); *H01M 10/613* (2015.04);
(Continued)

(58) Field of Classification Search
CPC ............. H01M 50/264; H01M 10/613; H01M 50/271; H01M 2220/20; H01M 50/242;
(Continued)

(56) References Cited

U.S. PATENT DOCUMENTS 6,085,854 A * 7/2000 Nishikawa .......... H01M 10/613
                                              180/68.5
8,079,435 B2 * 12/2011 Takasaki ............. H01M 50/202
                                              180/68.5
(Continued)

FOREIGN PATENT DOCUMENTS

CN    206893641 U  *  1/2018
CN    105599579 B  *  7/2018   ......... B60R 16/0215
(Continued)

OTHER PUBLICATIONS

DE-102016110787-A1 English Translation (Year: 2017).*
(Continued)

*Primary Examiner* — Michael T. Walsh
(74) *Attorney, Agent, or Firm* — David B. Kelley; Carlson, Gaskey & Olds, P.C.

(57) ABSTRACT

The present disclosure provides a vehicle battery enclosure and a corresponding vehicle. The vehicle battery enclosure comprises: an inner frame for supporting battery cells and including inner crossbeams that extend in a vehicle transverse direction and have through crossbeam openings facing a vehicle longitudinal direction; and an outer frame surrounding the inner frame, wherein, each inner crossbeam is connected to the outer frame through a joint component that (Continued)

includes an outer frame engagement area, an inner crossbeam engagement area, and an energy absorbing and connecting area between the outer frame engagement area and the inner crossbeam engagement area.

20 Claims, 8 Drawing Sheets

(51) Int. Cl.
 *B60L 50/64* (2019.01)
 *H01M 10/613* (2014.01)
 *H01M 50/271* (2021.01)
(52) U.S. Cl.
 CPC ...... H01M 50/271 (2021.01); *H01M 2220/20* (2013.01)
(58) Field of Classification Search
 CPC ............ H01M 50/249; H01M 50/244; H01M 50/204; H01M 50/298; H01M 50/35; B60L 50/64; B60L 50/66; B60K 2001/0438; B60K 1/00; B60K 2001/0405; B60K 2001/0461; B60K 6/40
 See application file for complete search history.

(56) References Cited

U.S. PATENT DOCUMENTS

| | | | | |
|---|---|---|---|---|
| 9,022,152 | B2 * | 5/2015 | Imamura | B62D 21/157 |
| | | | | 180/68.5 |
| 10,547,039 | B2 * | 1/2020 | Toyota | B60K 1/04 |
| 11,165,119 | B2 * | 11/2021 | Yamada | B60K 1/04 |
| 11,177,527 | B2 * | 11/2021 | Chen | H01M 50/204 |
| 2018/0237075 | A1 * | 8/2018 | Kawabe | B60L 50/66 |
| 2023/0318106 | A1 * | 10/2023 | Hase | H01M 50/202 |
| | | | | 429/176 |

FOREIGN PATENT DOCUMENTS

| | | | | |
|---|---|---|---|---|
| CN | 209592102 U | * | 11/2019 | |
| DE | 102016110787 A1 | * | 12/2017 | ............... B60K 1/04 |

OTHER PUBLICATIONS

CN-209592102-U English Translation (Year: 2019).*
CN-105599579-B English Translation (Year: 2018).*
CN-206893641-U English Translation (Year: 2018).*

* cited by examiner

BATTERY ENCLOSURE FOR ELECTRIFIED VEHICLE

RELATED APPLICATION(S)

This disclosure claims priority to Chinese Patent Application No. 2022109614323, filed Aug. 11, 2022, the entirety of which is herein incorporated by reference.

TECHNICAL FIELD

This disclosure relates to a battery enclosure for an electrified vehicle.

BACKGROUND

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers an electric machine and other electrical loads of an electrified vehicle. The traction battery pack includes a plurality of battery cells and various other battery internal components that are housed inside an outer enclosure assembly for supporting the electric propulsion of the vehicle.

SUMMARY

In some aspects, the techniques described herein relate to a vehicle battery enclosure, including: an inner frame for supporting battery cells, the inner frame including inner crossbeams that extend in a vehicle transverse direction and have crossbeam openings running through the inner crossbeams in a vehicle longitudinal direction; and an outer frame surrounding the inner frame, wherein each of the inner crossbeams is connected to the outer frame through a joint that includes an outer frame engagement area, an inner crossbeam engagement area, and an energy absorbing and connecting area between the outer frame engagement area and the inner crossbeam engagement area.

In some aspects, the techniques described herein relate to a vehicle battery enclosure, wherein: the crossbeam openings are located adjacent ends of each inner crossbeam, the outer frame engagement area includes a substrate bonded to the outer frame, and the energy absorbing and connecting area includes a connecting plate extending from the substrate and including a connecting plate opening overlapping to the crossbeam opening.

In some aspects, the techniques described herein relate to a vehicle battery enclosure, wherein reinforcing ribs are respectively provided inside the crossbeam openings and the connecting plate openings.

In some aspects, the techniques described herein relate to a vehicle battery enclosure, wherein the joint is formed as an independent joint bracket or integrated with the outer frame or the inner crossbeam.

In some aspects, the techniques described herein relate to a vehicle battery enclosure, wherein the energy absorbing and connecting area includes a substrate connecting portion connected to the substrate, an inner crossbeam connecting portion adjacent to the inner crossbeam engagement area, and an energy absorbing portion that is obliquely connected to the substrate connecting portion and the inner crossbeam connecting portion.

In some aspects, the techniques described herein relate to a vehicle battery enclosure, wherein the energy absorbing and connecting area includes two connecting plates respectively located on front and rear sides of the corresponding inner crossbeam.

In some aspects, the techniques described herein relate to a vehicle battery enclosure, wherein the inner crossbeam includes wings protruding from bottom to side.

In some aspects, the techniques described herein relate to a vehicle battery enclosure, wherein the inner frame further includes a plurality of battery cell support beams with ends supported on the wings.

In some aspects, the techniques described herein relate to a vehicle battery enclosure, wherein the inner frame further includes a central beam extending along the vehicle longitudinal direction and connecting the inner crossbeams.

In some aspects, the techniques described herein relate to a vehicle battery enclosure, wherein a longitudinally extending door shaped chamber and window shaped chambers located on both sides of the door shaped chamber are included inside the central beam.

In some aspects, the techniques described herein relate to a vehicle battery enclosure, further including a battery cooling plate located below the inner frame, wherein the central beam further includes a protruding bearing portion engaged to the battery cooling plate.

In some aspects, the techniques described herein relate to a vehicle battery enclosure, wherein the outer frame includes an outer frame front crossbeam located at a front end, and the outer frame front crossbeam includes a front wire harness connector and a bracket that protrudes forward of the front wire harness connector.

In some aspects, the techniques described herein relate to a vehicle battery enclosure, wherein the bracket includes a bracket substrate and a plate protruding forward from the bracket substrate.

In some aspects, the techniques described herein relate to a vehicle battery enclosure, wherein the bracket is one of two brackets respectively located on opposite sides of the front wire harness connector.

In some aspects, the techniques described herein relate to a vehicle battery enclosure, wherein the outer frame includes an outer frame rear crossbeam located at a rear end, and the outer frame rear crossbeam includes a rear wire harness through hole, a rear wire harness connector connected to the rear wire harness through hole, and a rear upper plate and a rear lower plate located on upper and lower sides of the rear wire harness connector, respectively, and wherein the rear upper plate and the rear lower plate protrude rearwards of the rear wire harness connector.

In some aspects, the techniques described herein relate to a vehicle battery enclosure, wherein the outer frame rear crossbeam further includes several blind holes for connecting the rear wire harness connectors around the rear wire harness through holes.

In some aspects, the techniques described herein relate to a vehicle battery enclosure, further including a battery pack upper cover and a battery pack tray, wherein the outer frame rear crossbeam includes a front upper plate and a front lower plate protruding forward, and the battery pack upper cover and the battery pack tray are respectively connected to the front upper plate and the front lower plate.

In some aspects, the techniques described herein relate to a vehicle battery enclosure, wherein the front upper plate includes a blind hole for connecting the battery pack upper cover.

In some aspects, the techniques described herein relate to a vehicle battery enclosure, including: an inner frame for supporting battery cells, including: inner crossbeams extending in a vehicle transverse direction and having crossbeam openings running through a vehicle longitudinal direction; a central beam extending in the vehicle longitudinal direction and connecting the inner crossbeams, wherein a longitudinally extending door shaped chamber and window shaped chambers located on both sides of the door shaped chamber are included inside the central beam; and an outer frame surrounding the inner frame, including: an outer frame front crossbeam located at a front end, the outer frame front crossbeam includes on its front side, a front wire harness connector and a bracket that protrudes forward of the front wire harness connector; and an outer frame rear crossbeam located at a rear end, the outer frame rear crossbeam includes a rear wire harness through hole, a rear wire harness connector connected to the rear wire harness through hole, and a rear upper plate and a rear lower plate respectively located on upper and lower sides of the rear wire harness connector, the rear plate and the rear lower plate protrude rearward of the rear wire harness connector, wherein the inner crossbeam is connected to the outer frame through a joint component that includes an outer frame engagement area, an inner crossbeam engagement area, and an energy absorbing and connecting area between the outer frame engagement area and the inner crossbeam engagement area, and there is a gap between the outer frame and the inner crossbeam.

DETAILED DESCRIPTION

Figure 1:
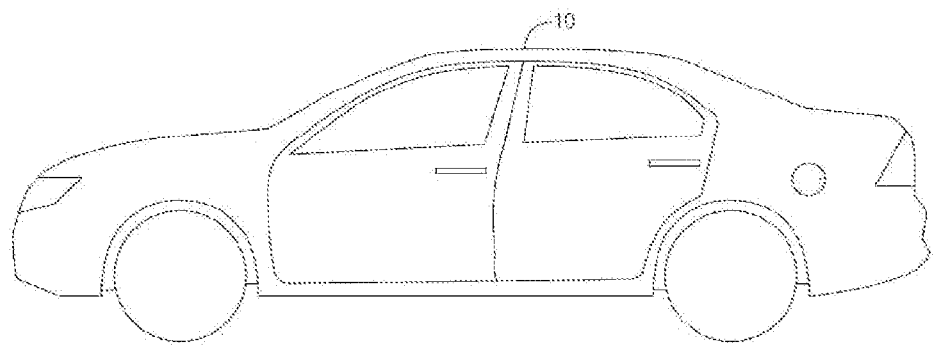
FIG. 1 shows a schematic diagram of a vehicle including a vehicle battery enclosure according to one or more embodiments of the present disclosure.

This disclosure relates to a battery enclosure for an electrified vehicle.

According to an aspect of the present disclosure, a vehicle battery enclosure is provided, comprising an inner frame for supporting battery cells, the inner frame including inner crossbeams that extend in a vehicle transverse direction and have crossbeam openings running through a vehicle longitudinal direction; and an outer frame surrounding the inner frame, wherein each of the inner crossbeams is connected to the outer frame through a joint component that includes an outer frame engagement area, an inner crossbeam engagement area, and an energy absorbing and connecting area between the outer frame engagement area and the inner crossbeam engagement area.

According to an embodiment of the present disclosure, the crossbeam openings are located at ends of each inner crossbeam, the outer frame engagement area includes a substrate bonded to the outer frame; the energy absorbing and connecting area includes a connecting plate extending from the substrate and comprising a connecting plate opening corresponding to the crossbeam opening.

According to an embodiment of the present disclosure, reinforcing ribs are respectively provided inside the crossbeam openings and the connecting plate openings.

According to an embodiment of the present disclosure, the joint component is formed as an independent joint bracket or integrated with the outer frame or the inner crossbeam.

According to an embodiment of the present disclosure, the energy absorbing and connecting area includes a substrate connecting portion connected to the substrate, an inner crossbeam connecting portion adjacent to the inner crossbeam engagement area, and an energy absorbing portion that is obliquely connected to the substrate connecting portion and the inner crossbeam connecting portion.

According to an embodiment of the present disclosure, the energy absorbing and connecting area includes two connecting plates respectively located on front and rear sides of the corresponding inner crossbeam.

According to an embodiment of the present disclosure, the inner crossbeam comprises wings protruding from bottom to side.

According to an embodiment of the present disclosure, the inner frame further includes a plurality of battery cell support beams with ends supported on the wings.

According to an embodiment of the present disclosure, the inner frame further includes a central beam extending along the vehicle longitudinal direction and connecting the inner crossbeams.

According to an embodiment of the present disclosure, a longitudinally extending door shaped chamber and window shaped chambers located on both sides of the door shaped chamber are included inside the central beam.

According to an embodiment of the present disclosure, the vehicle battery enclosure further comprises a battery cooling plate located below the inner frame, wherein the central beam further includes, on its lower side, a protruding bearing portion engaged to the battery cooling plate.

According to an embodiment of the present disclosure, the outer frame comprises an outer frame front crossbeam located at a front end, and the outer frame front crossbeam includes, on its front side, a front wire harness connector and a bracket that protrudes forward by a height exceeding a height of the front wire harness connector.

According to an embodiment of the present disclosure, the bracket comprises a bracket substrate connected to the front side of the outer frame front crossbeam and an eaves shaped plate protruding forward from the bracket substrate and located above the outer frame front crossbeam.

According to an embodiment of the present disclosure, there are two brackets respectively located on both sides of the front wire harness connector.

According to an embodiment of the present disclosure, the outer frame comprises an outer frame rear crossbeam located at a rear end, and the outer frame rear crossbeam includes a rear wire harness through hole, a rear wire harness connector connected to the rear wire harness through hole, and a rear upper eaves shaped plate and a rear lower eaves shaped plate located on upper and lower sides of the rear wire harness connector, wherein the rear upper eaves shaped plate and the rear lower eaves shaped plate protrude backwards by a height exceeding a height of the rear wire harness connector.

According to an embodiment of the present disclosure, the outer frame rear crossbeam further includes several blind holes for connecting the rear wire harness connectors around the rear wire harness through holes.

According to an embodiment of the present disclosure, the vehicle battery enclosure further comprises a battery pack upper cover and a battery pack tray, wherein a portion/all of the outer frame rear crossbeam comprises a front upper eaves shaped plate and a front lower eaves shaped plate protruding forward, and the battery pack upper cover and the battery pack tray are respectively connected to the front upper eaves shaped plate and the front lower eaves shaped plate in a sealed manner.

According to an embodiment of the present disclosure, the front upper eaves shaped plate comprises a blind hole for connecting the battery pack upper cover.

According to another aspect of the present disclosure, a vehicle battery enclosure is provided, comprising: an inner frame for supporting battery cells, comprising: inner crossbeams extending in a vehicle transverse direction and having crossbeam openings running through a vehicle longitudinal direction; a central beam extending in the vehicle longitudinal direction and connecting the inner crossbeams, wherein a longitudinally extending door shaped chamber and window shaped chambers located on both sides of the door shaped chamber are included inside the central beam; and an outer frame surrounding the inner frame, comprising: an outer frame front crossbeam located at a front end, the outer frame front crossbeam includes, on its front side, a front wire harness connector and a bracket that protrudes forward by a height exceeding a height of the front wire harness connector; and an outer frame rear crossbeam located at a rear end, the outer frame rear crossbeam includes a rear wire harness through hole, a rear wire harness connector connected to the rear wire harness through hole, and a rear upper eaves shaped plate and a rear lower eaves shaped plate respectively located on upper and lower sides of the rear wire harness connector, the rear upper eaves shaped plate and the rear lower eaves shaped plate protrude by a height exceeding a height of the rear wire harness connector, wherein the inner crossbeam is connected to the outer frame through a joint component that includes an outer frame engagement area, an inner crossbeam engagement area, and an energy absorbing and connecting area between the outer frame engagement area and the inner crossbeam engagement area, and there is a gap between the outer frame and the inner crossbeam.

According to yet another aspect of the present disclosure, a vehicle is provided, comprising a vehicle battery and a vehicle battery enclosure as described in any of the above embodiments.

Embodiments of the present disclosure are described below. However, it is to be understood that the disclosed embodiments are merely examples and other embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure. As will be understood by those of ordinary skill in the art, various features shown and described with reference to any one figure may be combined with features shown in one or more other figures to produce embodiments not expressly shown or described. The combinations of features shown herein provide representative embodiments for typical disclosures. However, various combinations and modifications of the features consistent with the teachings of the present disclosure may be desired for certain particular applications or implementations.

In this document, when an element or part is referred to as being "on . . . ", "bonded to", "connected to", or "coupled to" another element or part, the element or part can be directly on another element or part, can be bonded, connected or coupled to another element or part, or there may be intervening elements or parts. In contrast, when an element is referred to as being "directly on . . . ", "directly bonded to", "directly connected to", or "directly coupled to" another element or part, the intervening elements or parts may not be present. Other words used to describe the relationship between elements should be interpreted in a like fashion.

Figure 2:
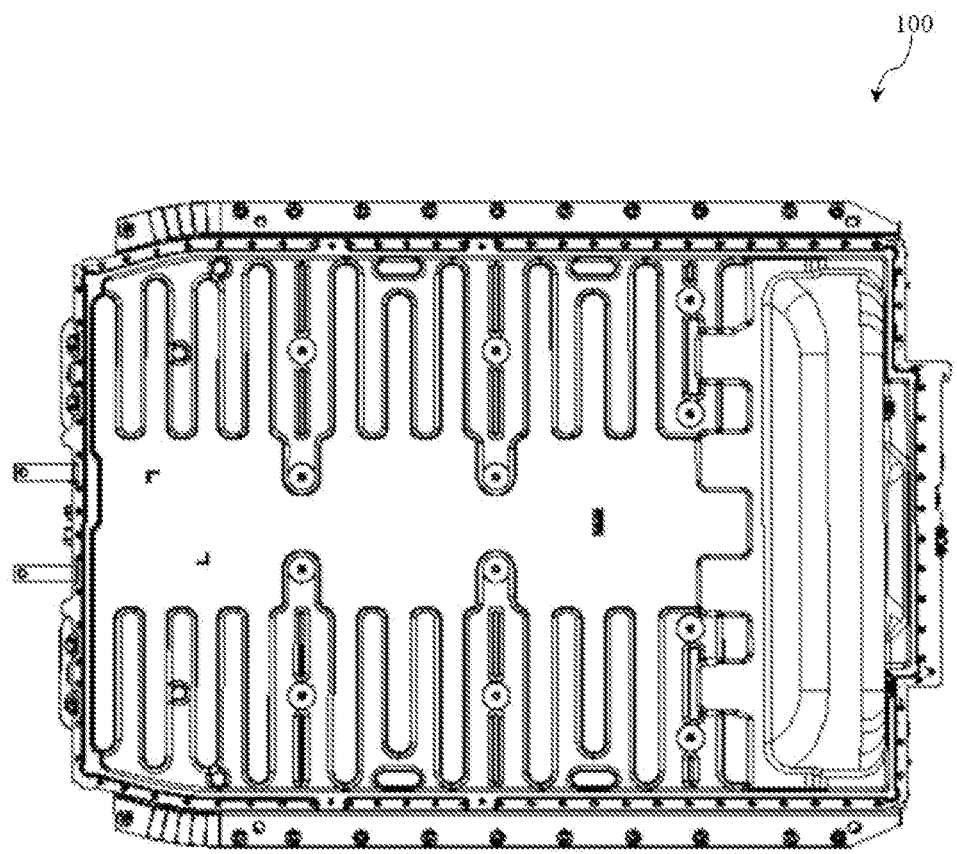
FIG. 2 shows a top view of the vehicle battery enclosure according to one or more embodiments of the present disclosure.
Figure 3:
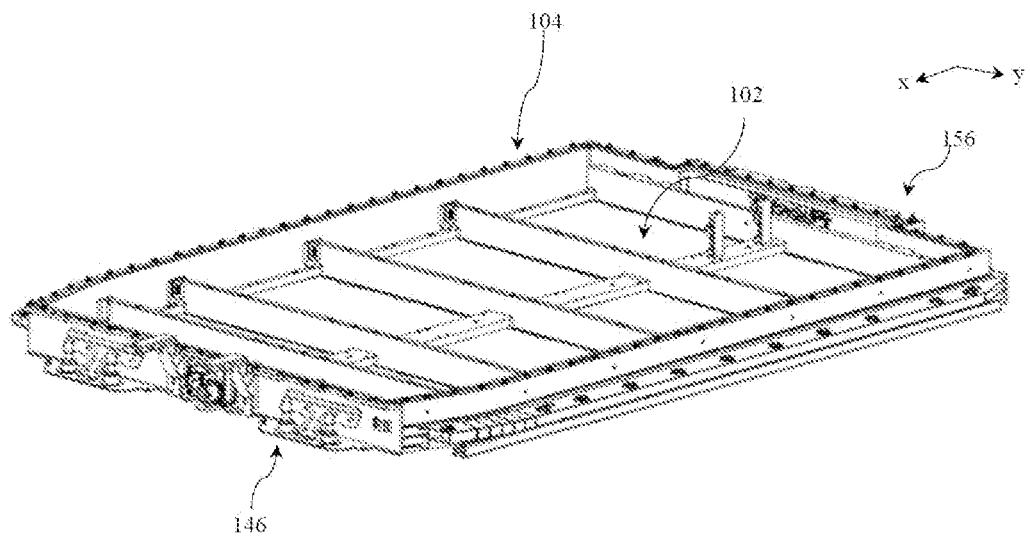
FIG. 3 shows a perspective view of a main body of the vehicle battery enclosure according to one or more embodiments of the present disclosure, viewed from the front of the vehicle.
Figure 4:
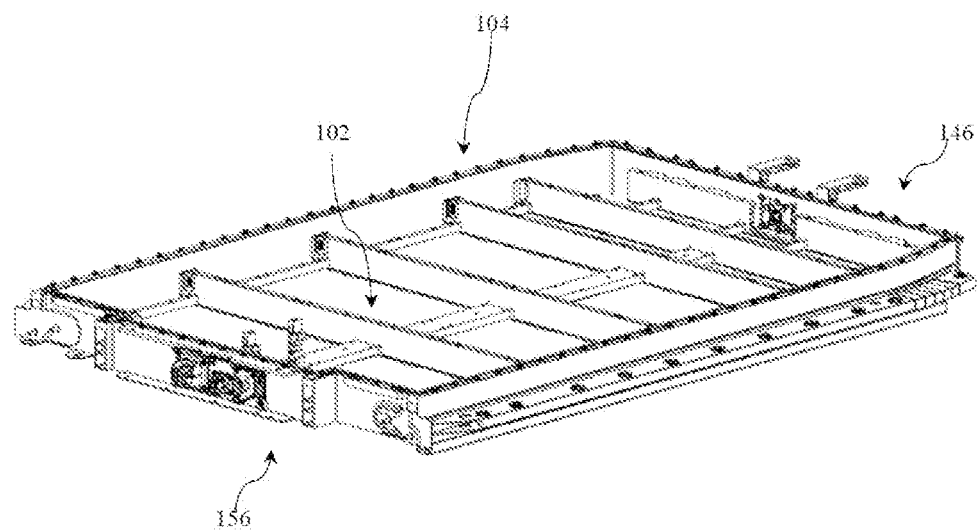
FIG. 4 shows a perspective view of the main body of the vehicle battery enclosure according to one or more embodiments of the present disclosure, viewed from the rear of the vehicle.

FIG. 1 generally provides a schematic diagram of a vehicle 10 including a vehicle battery enclosure 100 (FIG. 2) according to one or more embodiments of the present disclosure. It should be understood that in the context of the present disclosure, the vehicle 10 implementing the present disclosure can refer to any means of transportation including vehicle batteries, such as but not limited to fossil fuel vehicles, electric vehicles (such as plug-in hybrid electric vehicles (PHEVs), fully hybrid electric vehicles (FHEVs), mild hybrid electric vehicles (MHEVs) or battery electric vehicles (BEVs), and even ships, aircrafts, etc. The vehicle can include components related to mobility, such as engine, electric motor, transmission, suspension, drive shaft, and/or wheels. The vehicle can be non-autonomous, semi-autonomous (for example, some conventional motion functions are controlled independently by the vehicle) or autonomous (for example, motion functions are controlled independently by the vehicle without direct input from user).

One aspect of the present disclosure provides a vehicle battery enclosure 100. Referring to FIGS. 2 to 15 as a whole, the vehicle battery enclosure 100 includes an inner frame 102 and an outer frame 104. The outer frame 104 surrounds the inner frame 102 from all sides and can be connected to, for example, a portion of the vehicle body, such as a beam (not shown) of the vehicle 10. The inner frame 102 is used to support several vehicle battery cells and includes several inner crossbeams 108 extending in a vehicle transverse direction (i.e. y direction). Each of the inner crossbeams 108 has crossbeam openings 110 running through a vehicle longitudinal direction (i.e. x direction), that is, the crossbeam openings 110 run through the inner crossbeam 108 along front and rear directions of the vehicle to form a passage, as shown in FIGS. 3, 5, 6, and 7. Each of the inner crossbeams 108 is connected to the outer frame 104 through a joint component 106. Further referring to FIGS. 6, 7, and 8, the joint component 106 includes an outer frame engagement area 112 engaged to the outer frame 104, an inner crossbeam engagement area 118 engaged to the inner crossbeam 108, and an energy absorbing and connecting area 114. The energy absorbing and connecting area 114 is located between the outer frame engagement area 112 and the inner crossbeam engagement area 118, and can absorb energy through deformation (such as bending). The connection of the joint component 106 creates a gap 178 between the outer frame 104 and an end face 180 of the inner crossbeam 108, such as but not limited to a gap of 4 mm-10 mm, as shown in FIG. 8. It should be understood that the expressions of "vehicle transverse direction", "vehicle longitudinal direction", and other directionality mentioned in the context do not necessarily mean that they must completely coincide with the corresponding direction, but can be offset by several angles, that is, roughly oriented in the corresponding direction.

Figure 6:
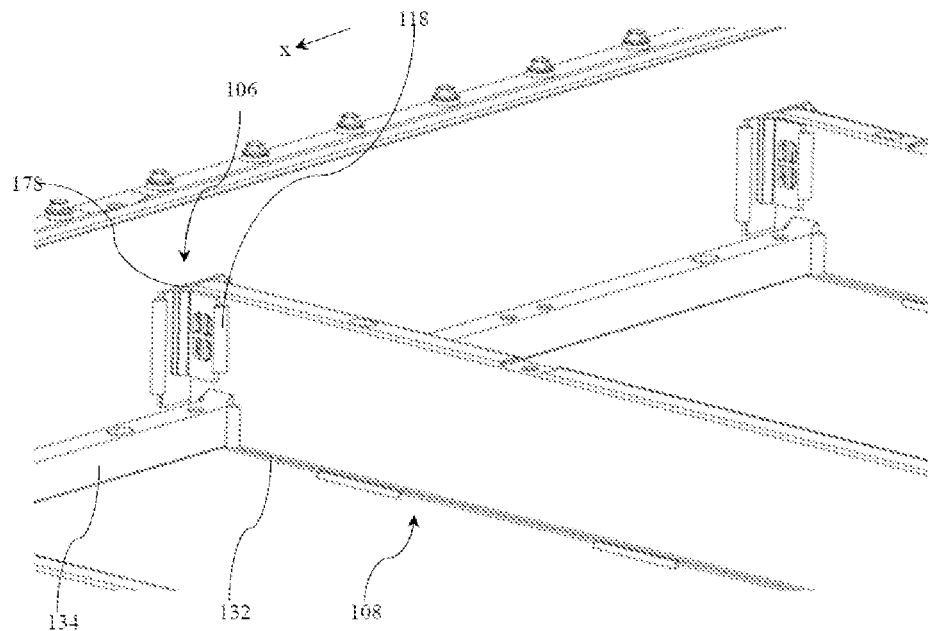
FIG. 6 shows a partially enlarged view of the vehicle battery enclosure according to one or more embodiments of the present disclosure, showing a joint component of an inner crossbeam and the outer frame.
Figure 7:
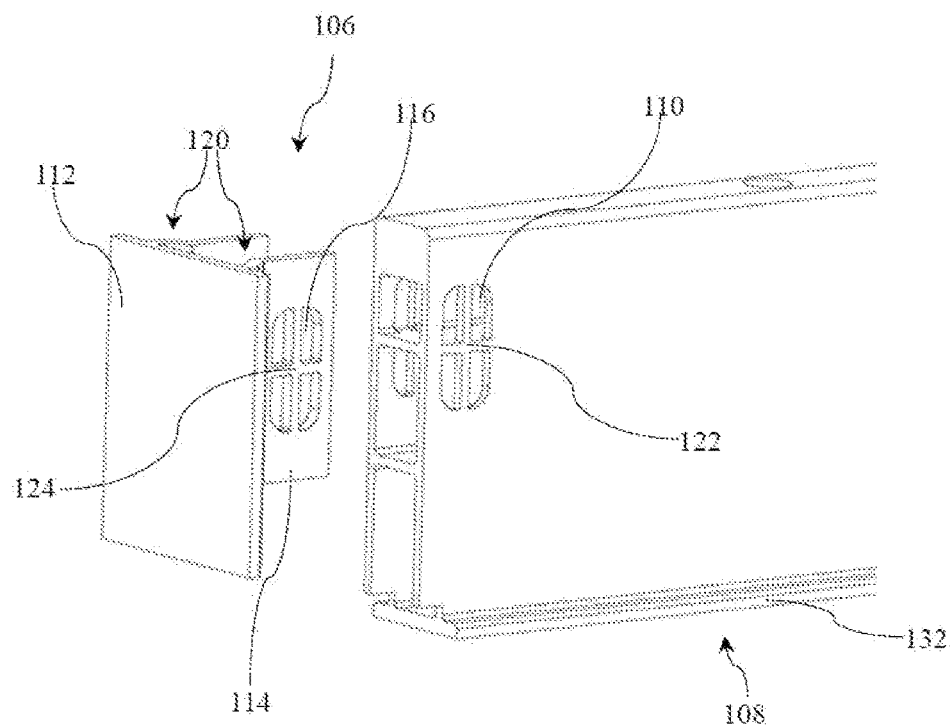
FIG. 7 shows a partially exploded view of the vehicle battery enclosure according to one or more embodiments of the present disclosure, showing ends of the joint component and the inner crossbeam.
Figure 8:
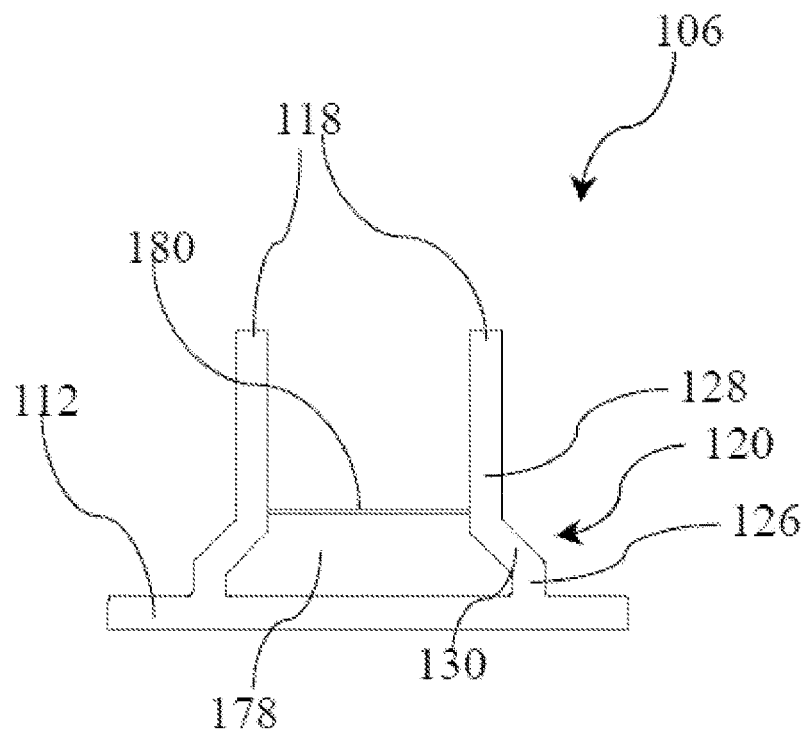
FIG. 8 shows a top view of the joint component of the vehicle battery enclosure according to one or more embodiments of the present disclosure.

Furthermore, referring to FIGS. 6 and 7, in this embodiment, the outer frame engagement area 112 can be a substrate 112 that is bonded (such as welded) to the outer frame 104, the energy absorbing and connecting area 114 can be a connecting plate 114 extending from the substrate 112, and the inner crossbeam engagement area 118 can be a welding area 118 that is connected between the connecting plate 114 and the inner crossbeam 108. The crossbeam openings 110 can be located at both ends of each inner crossbeam 108, and the connecting plate 114 can include a connecting plate opening 116 corresponding to the crossbeam opening 110, that is, the crossbeam opening 110 can fully or partially overlap with the connecting plate opening 116. Therefore, the crossbeam opening 110 located at the end of each inner crossbeam 108 and the corresponding connecting plate opening 116 form a channel extending inside the vehicle battery enclosure 100 in the vehicle longitudinal direction (i.e. x direction). This channel is conducive to quickly transferring gas from both sides inside the battery enclosure 100 to the position of a battery exhaust valve (not shown), which is usually located at the front, to discharge the gas out of the battery, so as to realize better thermal management of the battery.

In some embodiments, as shown in FIGS. 6, 7, and 8, the joint component 106 may be an independent joint bracket for connecting the inner crossbeam 108 and the outer frame 104. In some other embodiments, the joint component 106 can be integrated with the outer frame 104 or the inner crossbeam 108, that is, form a part of the outer frame 104 or the inner crossbeam 108. In addition, in the embodiments shown in FIGS. 7 and 8, there are two connecting plates 114, each located on front and rear sides of the end of the corresponding inner crossbeam 108, providing more stable support for the inner crossbeam 108.

As shown in FIG. 8, in several embodiments of the present disclosure, the energy absorbing and connecting area 114 may include a substrate connecting portion 126 connected to the substrate 112, an inner crossbeam connecting portion 128 adjacent to the inner crossbeam engagement area (in this case, a welding area) 118, and an energy absorbing portion 130 between the substrate connecting portion 126 and the inner crossbeam connecting portion 128. The energy absorbing portion 130 is obliquely connected to the substrate connecting portion 126 and the inner crossbeam connecting portion 128 to form a generally "lightning bolt" shape, that is, when viewed from a top view, extension lines of the substrate connecting portion 126 and the inner crossbeam connecting portion 128 are parallel to each other but staggered by a distance, and two opposite bends are formed at the corresponding connection positions between the two and the energy absorbing portion 130. In the case of compression on the outer frame 104, this feature absorbs energy through the bending of the energy absorbing portion 130, thereby helping to disperse the energy to the joint components 106 of the inner crossbeams 108 located at the front and rear, and reducing excessive energy in a certain area. In the case where each joint component 106 includes two connecting plates 114, a distance between the paired two inner crossbeam connecting portions 128 can be less than a distance between the two substrate connecting portions 126.

Referring again to FIG. 7, reinforcing ribs 122 can be respectively arranged inside the crossbeam openings 110 and/or the connecting plate openings 116. The reinforcing ribs 122 can provide a certain degree of support for the crossbeam openings 110 and the connecting plate openings 116 to enhance strength and resist deformation. In some embodiments, the reinforcing ribs 122 may have a cross shaped shape to provide better support in both intersecting directions. Of course, in other embodiments, the reinforcing ribs 122 can also take different shapes, such as but not limited to triangles, diamonds, circles, etc.

Figure 9:
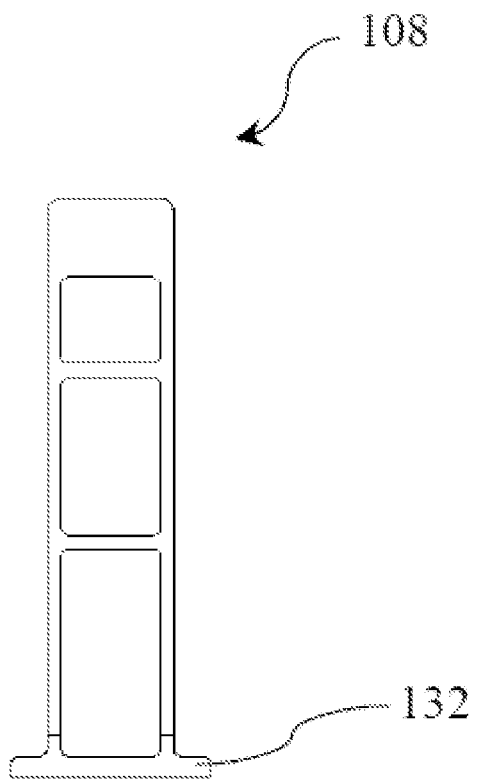
FIG. 9 shows an end view of the inner crossbeam of the vehicle battery enclosure according to one or more embodiments of the present disclosure.

Referring to the end face of the inner crossbeam 108 shown in FIG. 9, it can be seen that the inner crossbeam 108 can include wings 132 protruding from its underside/bottom to side, resulting in an overall inverted T-shape. Further, the inner frame 102 can also include a plurality of battery cell support beams 134 with ends supported on the wings 132 of the inner crossbeam 108, with reference to FIGS. 5 and 6. The battery cell support beam 134 can also be further welded to the inner crossbeam 108. The several battery cell support beams 134 shown in the figure are supported on the wings 132 of the two adjacent inner crossbeams 108 through both ends and adjacent to the outer frame 104, but more battery cell support beams 134 can also be included on their inner side, which is not limited here. In an installed state, lateral surface of the vehicle battery cell (not shown) can be supported on the battery cell support beam 134 to provide better support for the battery cell.

Figure 5:
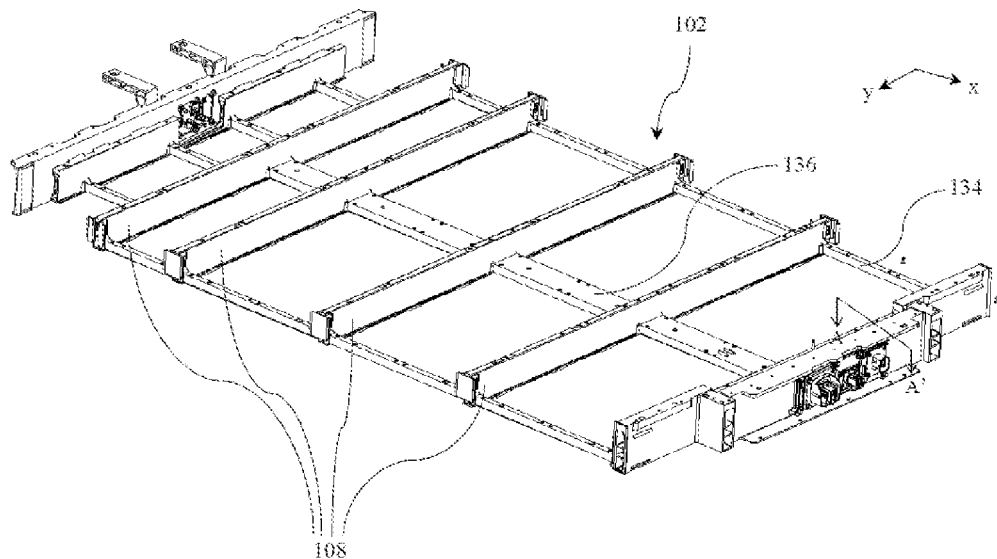
FIG. 5 shows a perspective view of an inner frame and a part of an outer frame of the vehicle battery enclosure according to one or more embodiments of the present disclosure.
Figure 10:
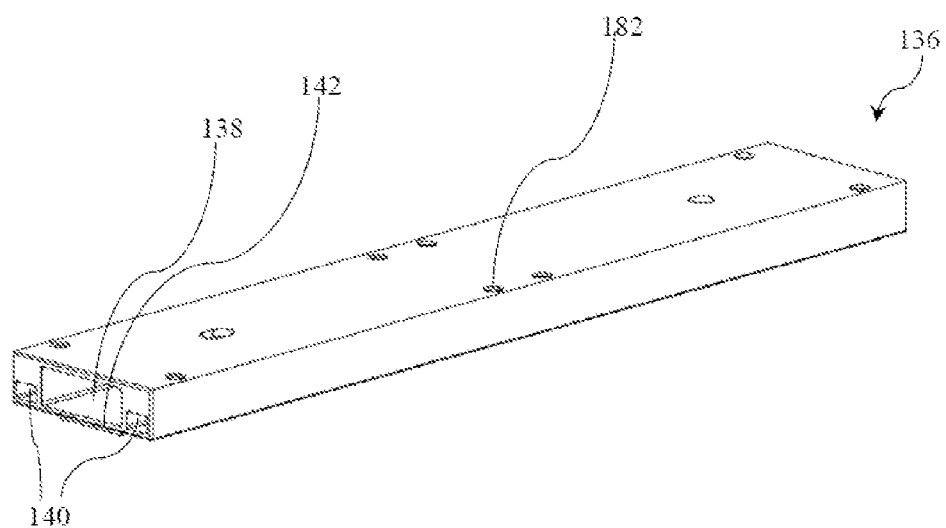
FIG. 10 shows a perspective view of a section of a central beam of the vehicle battery enclosure according to one or more embodiments of the present disclosure.
Figure 11:
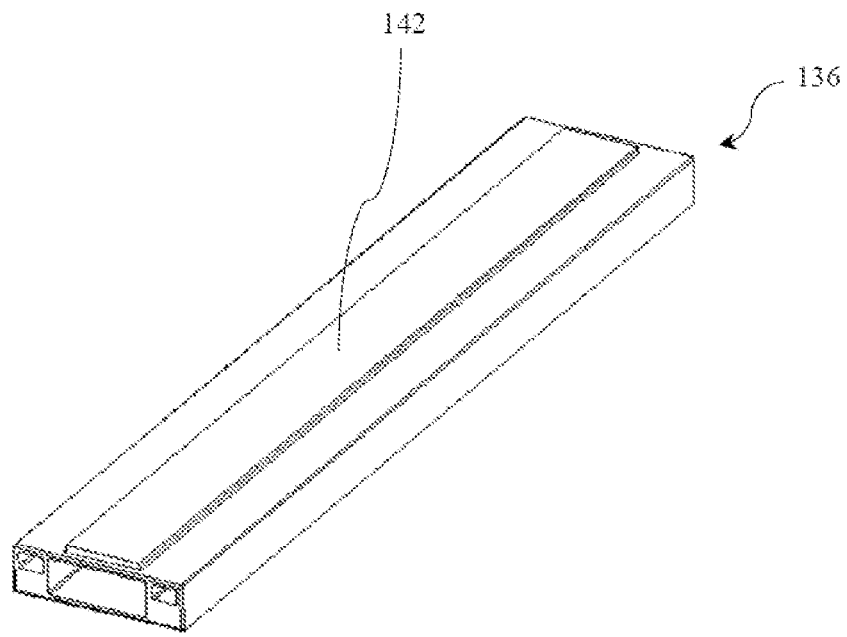
FIG. 11 shows a top view of a section of the central beam of the vehicle battery enclosure according to one or more embodiments of the present disclosure.

Further referring to FIGS. 5, 10, and 11, the inner frame 102 can also include a central beam 136 in a middle position, which extends along the vehicle longitudinal direction x and connects several inner crossbeams 108, such as but not limited to through welding connections, thereby further increasing support force on the vehicle battery cell. In the embodiments shown in FIGS. 10 and 11, from a cross-sectional view, a door shaped chamber 138 extending longitudinally along a main body of the central beam 136, and two window shaped chambers 140 located on both sides of the door shaped chamber 138 are included inside the central beam 136. The larger door shaped chamber 138 located in the middle can significantly reduce the weight of the central beam 136 and enhance support, while the window shaped chambers 140 located on both sides can provide fastening positions for the fixation of the vehicle battery cells (not shown). Fasteners of the vehicle battery cells can penetrate through multiple installation holes 182 on an upper side of the central beam 136 into the window shaped chamber 140 to secure the lateral surface of the vehicle battery cell to the central beam 136. Referring to the perspective view of FIG. 10 and the bottom view of FIG. 11, the central beam 136 also includes a protruding bearing portion 142 on a lower side. In the installed state, the bearing portion 142 is engaged (such as welded) to a battery cooling plate 144 of the vehicle battery enclosure 100 to provide closer contact and better connection strength with the battery cooling plate 144.

Figure 15:
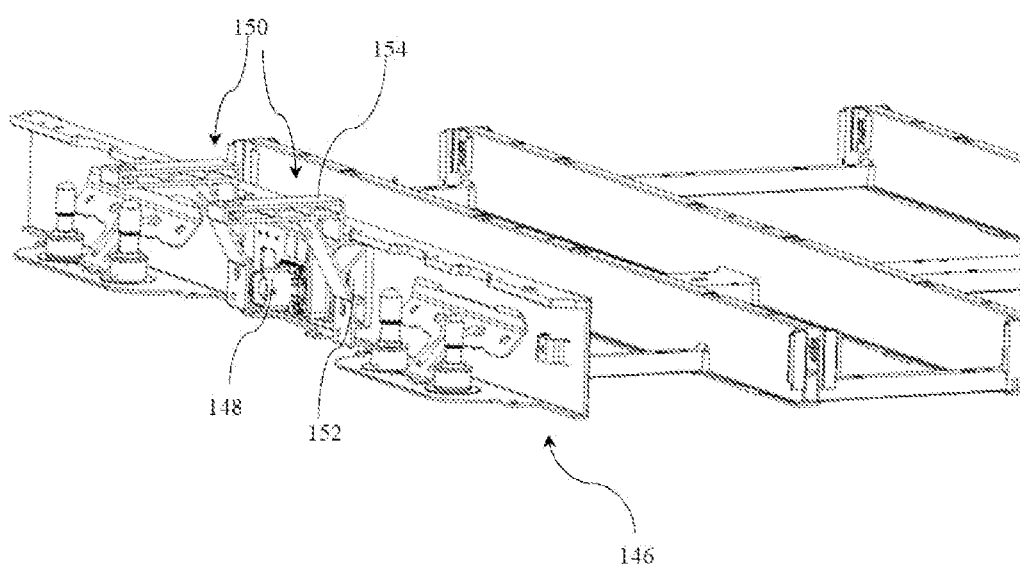
FIG. 15 shows a perspective view of an outer frame front crossbeam of the vehicle battery enclosure according to one or more embodiments of the present disclosure.

The outer frame 104 of the vehicle battery enclosure 100 can also include an outer frame front crossbeam 146 located at a front end. Referring to FIG. 15, which shows a perspective view of the outer frame front crossbeam of the vehicle battery enclosure according to one or more embodiments of the present disclosure, the outer frame front crossbeam 146 includes on its front side (generally referring to the side facing the front of the vehicle), a front wire harness connector 148 and two eaves shaped brackets 150. The brackets 150 protrude forward by a distance that generally exceeds the corresponding dimension of the front wire harness connector 148 protruding forward, as shown in the figure. This resists undesired contact with the front wire harness connector 148. The brackets 150 can include a bracket substrate 152 connected to the front side of the outer frame front crossbeam 146, and a eaves shaped plate 154 protruding forward from the bracket substrate 152. The eaves shaped plate 154 can be located above the outer frame front crossbeam 146. In some embodiments, such as that of FIG. 15, there can be two brackets 150, located on both sides of the front wire harness connector 148, to resist contact with the front wire harness connector 148 in multiple directions. This disclosure extends to an arrangement with one or more brackets.

Figure 12:
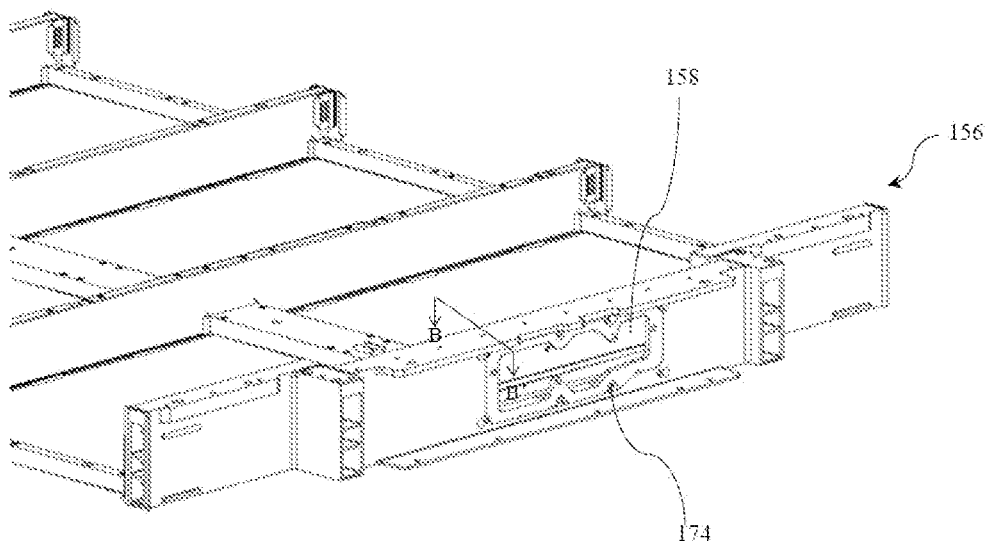
FIG. 12 shows a perspective view of a main body of an outer frame rear crossbeam of the vehicle battery enclosure according to one or more embodiments of the present disclosure.
Figure 13:
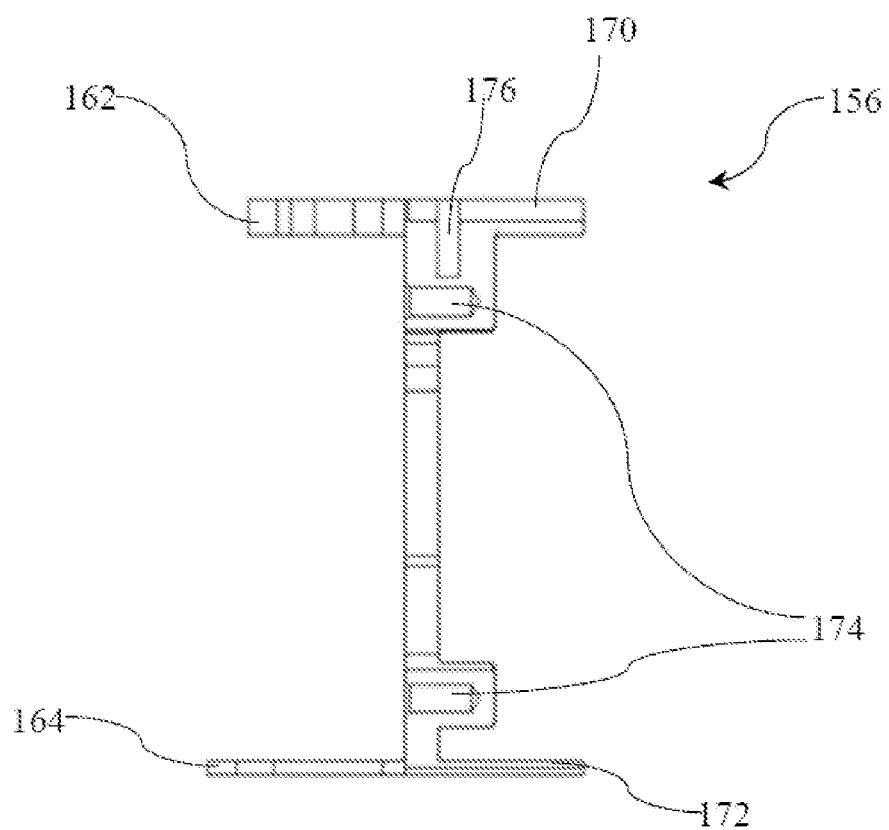
FIG. 13 shows a cross-sectional view of the outer frame rear crossbeam of the vehicle battery enclosure according to one or more embodiments of the present disclosure, taken along section B-B' shown in FIG. 12.
Figure 14:
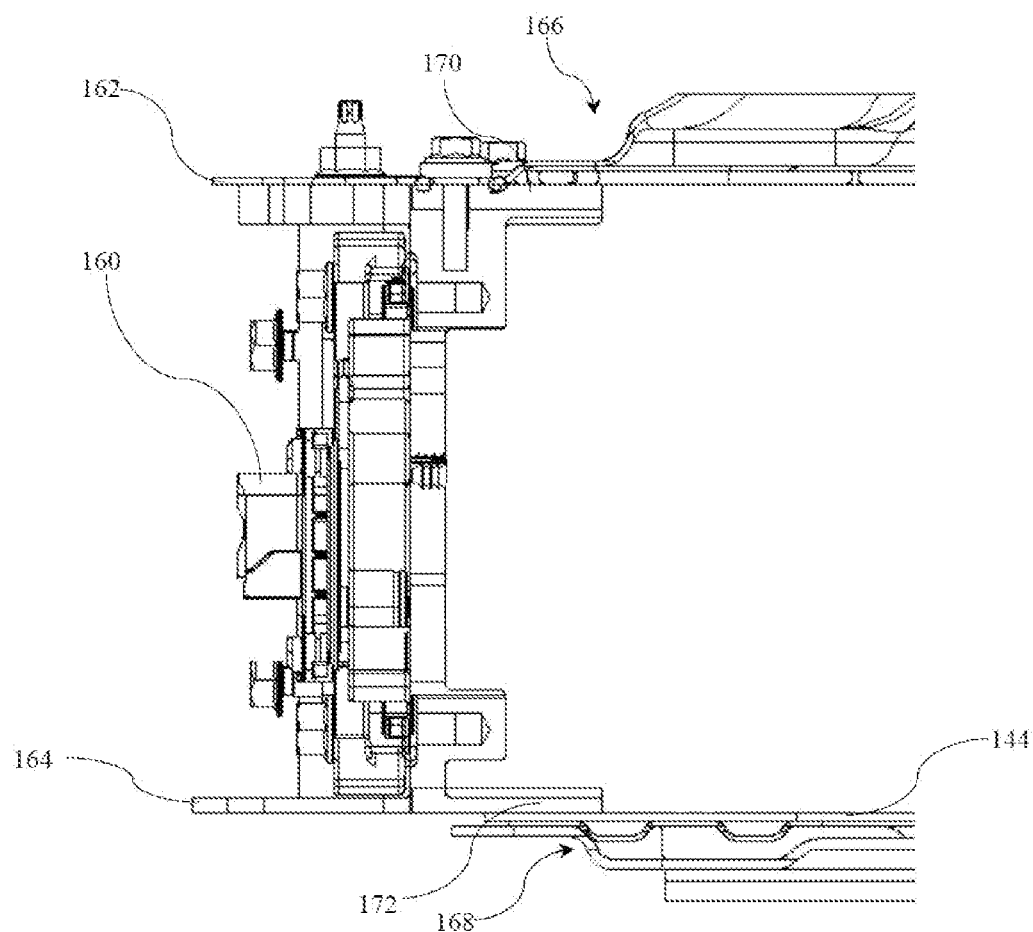
FIG. 14 shows a cross-sectional view of the outer frame rear crossbeam of the vehicle battery enclosure according to one or more embodiments of the present disclosure, taken along section A-A' shown in FIG. 5.

In addition, the outer frame 104 of the vehicle battery enclosure 100 can also include an outer frame rear crossbeam 156 located at a rear end, as shown in FIGS. 12, 13, and 14. The outer frame rear crossbeam 156 can include a rear wire harness through hole 158, a rear wire harness connector 160, a rear upper eaves shaped plate 162, and a rear lower eaves shaped plate 164. The rear wire harness through hole 158 can provide a passage for battery rear wire harness to pass through. The rear wire harness connector 160 can be connected to the outer frame rear crossbeam 156 around the rear wire harness through hole 158, covering the rear wire harness through hole 158, and electrically connected to the battery rear wire harness. The rear upper eaves shaped plate 162 and the rear lower eaves shaped plate 164 are respectively connected to the outer frame rear crossbeam 156 on upper and lower sides of the rear wire harness connector 160, and the rear upper eaves shaped plate 162 and the rear lower eaves shaped plate 164 protrude backwards (generally referring to the side facing the rear of the vehicle) by a height that generally exceeds the height of the rear wire harness connector 160 protruding backwards. This resists undesired contact with the rear wire harness connector 160. In the embodiment shown in the figure, the outer frame rear crossbeam 156 can also include several blind holes 174 for connecting the rear wire harness connectors around the rear wire harness through hole 158. The rear wire harness connectors 160 can be connected to the outer frame rear crossbeam 156 through these blind holes 174 for connecting the rear wire harness connectors, which can ensure the sealing of several connection points here and the airtightness inside the vehicle battery enclosure 100. The outer frame rear crossbeam 156 can be thickened at the blind hole 174 for connecting the rear wire harness connectors to accommodate the corresponding blind hole.

Furthermore, the vehicle battery enclosure 100 may also include a battery pack upper cover 166 and a battery pack tray 168 to enclose the interior of the vehicle battery enclosure 100 from above and below, as shown in FIG. 14. A portion/all of the outer frame rear crossbeam 156 includes a front upper eaves shaped plate 170 and a front lower eaves shaped plate 172 protruding forward (generally referring to the side facing the front of the vehicle), as shown in FIG. 13. The front upper eaves shaped plate 170 and the front lower eaves shaped plate 172 provide sufficient sealing connection positions for the battery pack upper cover 166 and the battery pack tray 168, respectively, to ensure the airtightness inside the vehicle battery enclosure 100. According to several embodiments of the present disclosure, the front upper eaves shaped plate 170 can also include blind holes 176 for connecting the battery pack cover, as shown in FIG. 13. This can also ensure the sealing of several connection points here and the airtightness inside the vehicle battery enclosure 100.

Those skilled in the art can understand that manufacturing materials of various components of the vehicle battery enclosure 100 mentioned above and below may include but are not limited to various models of aluminum alloys, magnesium alloys, various low-, medium-, and high-carbon steels, and any other metal/non-metallic or synthetic materials. In addition, the engagement or connections mentioned above or below can be achieved through various alternative methods, such as welding, clamping, riveting, threaded connections, etc. The welding can include, such as, but not limited to, inert gas shielded welding.

According to another aspect of the present disclosure, the present disclosure further provides a vehicle battery enclosure 100, with overall reference to FIGS. 2-15 as a whole, the vehicle battery enclosure 100 comprises an inner frame 102 supporting battery cells and an outer frame 104 surrounding the inner frame 102. The inner frame 102 includes inner crossbeams 108 extending in a vehicle transverse direction y and a central beam 136 extending in a vehicle longitudinal direction x. The inner crossbeams 108 have crossbeam opening 110 running through the vehicle longitudinal direction x. The central beam 136 connects the inner crossbeams 108 and a longitudinally extending door shaped chamber 138 and window shaped chambers 140 located on both sides of the door shaped chamber 138 are included inside the central beam 136. The outer frame 104 includes an outer frame front crossbeam 146 located at a front end and an outer frame rear crossbeam 156 located at a rear end. A front side of the outer frame front crossbeam 146 includes a front wire harness connector 148 and a bracket 150 that protrudes forward by a height beyond a height of the front wire harness connector 148 protruding forward. The outer frame rear crossbeam 156 includes a rear wire harness through hole 158, a rear wire harness connector 160 connected to the rear wire harness through hole 158, and a rear upper eaves shaped plate 162 and a rear lower eaves shaped plate 164 located on upper and lower sides of the rear wire harness connector 160, respectively. The rear upper eaves shaped plate 162 and the rear lower eaves shaped plate 164 protrude backwards a height that exceeds the height of the rear wire harness connector 160 protruding backwards. Each of the inner crossbeams 108 is connected to the outer frame 104 through a joint component 106 that includes an outer frame engagement area 112, an inner crossbeam engagement area 118, and an energy absorbing and connecting area 114 between the outer frame engagement area 112 and the inner crossbeam engagement area 118. There is a gap 178 between the outer frame 104 and the inner crossbeam 108. It should be understood that all the embodiments, features, and advantages described above for the vehicle battery enclosure according to the first aspect of the present disclosure are equally applicable to the vehicle battery enclosure according to the other aspect of the present disclosure, provided that they do not conflict with each other. That is to say, all embodiments and their variations mentioned above can be directly applied and combined with them. For the sake of brevity in this disclosure, it will not be repeated here.

According to yet another aspect of the present disclosure, there is also provided a vehicle 10, comprising a vehicle battery and a vehicle battery enclosure 100 as described in any of the above embodiments, as shown in FIG. 1. Similarly, all the embodiments, features, and advantages described above for the vehicle battery enclosure 100 according to the present disclosure are equally applicable to the vehicle 10 according to the present disclosure, and will not be repeated here.

To sum up, compared with the prior art, the invention proposes a vehicle battery enclosure and a corresponding vehicle including the vehicle battery enclosure. The vehicle battery enclosure can not only provide sufficient support and buffer for the vehicle battery, but also provide more favorable features for the thermal runaway management of the battery, thus further improving the satisfaction of vehicle users.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle battery enclosure, comprising:
   an inner frame including inner crossbeams extending in a vehicle transverse direction, wherein the inner crossbeams include crossbeam openings running therethrough in a vehicle longitudinal direction; and
   an outer frame surrounding the inner frame,
   wherein each of the inner crossbeams is connected to the outer frame through a joint,
   wherein the joint includes an outer frame engagement area, an inner crossbeam engagement area, and an energy absorbing and connecting area between the outer frame engagement area and the inner crossbeam engagement area,
   wherein the energy absorbing and connecting area includes a connecting plate comprising a connecting plate opening extending in the vehicle longitudinal direction.

2. The vehicle battery enclosure of claim 1, wherein:
   the crossbeam openings are located adjacent ends of each inner crossbeam,
   the connecting plate extends from a substrate of the outer frame engagement area, and the connecting plate opening overlaps the crossbeam to define a through-channel extending through the connecting plate and the inner crossbeam in the vehicle longitudinal direction.

3. The vehicle battery enclosure of claim 2, wherein reinforcing ribs are respectively provided inside the crossbeam openings and the connecting plate openings.

4. The vehicle battery enclosure of claim 1, wherein the joint is formed as an independent joint bracket or integrated with the outer frame or the inner crossbeam.

5. The vehicle battery enclosure of claim 2, wherein the energy absorbing and connecting area includes a substrate connecting portion connected to the substrate, an inner crossbeam connecting portion adjacent to the inner crossbeam engagement area, and an energy absorbing portion that is obliquely connected to the substrate connecting portion and the inner crossbeam connecting portion.

6. The vehicle battery enclosure of claim 2, wherein:
   the energy absorbing and connecting area includes two connecting plates respectively located on front and rear sides of a corresponding inner crossbeam,
   each of the connecting plates includes a connecting plate opening extending in the vehicle longitudinal direction,
   each inner crossbeam includes a front and rear side,
   the front and rear sides of the inner crossbeam each include a crossbeam opening,
   the connecting plate openings laterally and vertically overlap the crossbeam openings to form a through-channel extending longitudinally through the connecting plate and crossbeam.

7. The vehicle battery enclosure of claim 1, wherein the inner crossbeam comprises wings protruding from bottom to side.

8. The vehicle battery enclosure of claim 7, wherein the inner frame further includes a plurality of battery cell support beams with ends supported on the wings.

9. The vehicle battery enclosure of claim 1, wherein the inner frame further includes a central beam extending along the vehicle longitudinal direction and connecting the inner crossbeams.

10. The vehicle battery enclosure of claim 9, wherein a longitudinally extending door shaped chamber and a window shaped chamber located on each side of the door shaped chamber are included inside the central beam.

11. The vehicle battery enclosure of claim 9, further comprising a battery cooling plate located below the inner frame, wherein the central beam further includes a protruding bearing portion engaged to the battery cooling plate.

12. The vehicle battery enclosure of claim 1, wherein the outer frame comprises an outer frame front crossbeam located at a front end, and the outer frame front crossbeam includes a front wire harness connector and a bracket that protrudes forward of the front wire harness connector.

13. The vehicle battery enclosure of claim 12, wherein the bracket comprises a bracket substrate and a plate protruding forward from the bracket substrate.

14. The vehicle battery enclosure of claim 13, wherein the bracket is one of two brackets respectively located on opposite sides of the front wire harness connector.

15. The vehicle battery enclosure of claim 1, wherein the outer frame comprises an outer frame rear crossbeam located at a rear end, and the outer frame rear crossbeam includes a rear wire harness through hole, a rear wire harness connector connected to the rear wire harness through hole, and a rear upper plate and a rear lower plate located on upper and lower sides of the rear wire harness connector, respectively, and wherein the rear upper plate and the rear lower plate protrude rearwards of the rear wire harness connector.

16. The vehicle battery enclosure of claim 15, wherein the outer frame rear crossbeam further includes several blind holes.

17. The vehicle battery enclosure of claim 15, further comprising a battery pack upper cover and a battery pack tray, wherein the outer frame rear crossbeam comprises a front upper plate and a front lower plate protruding forward, and the battery pack upper cover and the battery pack tray are respectively connected to the front upper plate and the front lower plate, and wherein the front upper plate comprises a blind hole.

18. A vehicle battery enclosure, comprising:
an inner frame, comprising:
inner crossbeams extending in a vehicle transverse direction and having crossbeam openings running therethrough in a vehicle longitudinal direction;
a central beam extending in the vehicle longitudinal direction and connecting the inner crossbeams, wherein a longitudinally extending door shaped chamber and window shaped chambers located on both sides of the door shaped chamber are included inside the central beam; and
an outer frame surrounding the inner frame, comprising:
an outer frame front crossbeam located at a front end, the outer frame front crossbeam includes on a front side thereof, a front wire harness connector and a bracket that protrudes forward of the front wire harness connector; and
an outer frame rear crossbeam located at a rear end, the outer frame rear crossbeam includes a rear wire harness through hole, a rear wire harness connector connected to the rear wire harness through hole, and a rear upper plate and a rear lower plate respectively located on upper and lower sides of the rear wire harness connector, the rear plate and the rear lower plate protrude rearward of the rear wire harness connector,
wherein the inner crossbeam is connected to the outer frame through a joint component that includes an outer frame engagement area, an inner crossbeam engagement area, and an energy absorbing and connecting area between the outer frame engagement area and the inner crossbeam engagement area, and there is a lateral gap defined between the outer frame engagement area and an end face of the inner crossbeam.

19. A vehicle battery enclosure, comprising:
an inner frame with crossbeams extending transversely and having openings extending longitudinally; and
an outer frame surrounding the inner frame,
wherein each crossbeam connects to the outer frame via a joint including an outer frame engagement area, an inner crossbeam engagement area, and an energy absorbing area with a connecting plate having an opening that overlaps the crossbeam opening to form a through-channel extending longitudinally and through the connecting plate and crossbeam.

20. The vehicle battery enclosure of claim 3, wherein the reinforcing ribs of the crossbeam openings and of the connecting plate openings exhibit a common arrangement such that the reinforcing ribs of the crossbeam openings and of the connecting plate openings are able to be laterally and vertically aligned with one another.

* * * * *